United States Patent [19]

Saylor et al.

[11] 4,084,366
[45] Apr. 18, 1978

[54] SOUND ABSORBING PANEL

[75] Inventors: Charles J. Saylor, Zeeland; Richard G. Haworth, Holland, both of Mich.; Lyle F. Yerges, Downers Grove, Ill.

[73] Assignee: Haworth Mfg., Inc., Holland, Mich.

[21] Appl. No.: 631,855

[22] Filed: Nov. 14, 1975

[51] Int. Cl.² ............................................. E04B 2/28
[52] U.S. Cl. ..................................... 52/615; 181/292
[58] Field of Search ................. 52/615, 618, 624, 625, 52/627, 628, 145; 161/68; 181/33 G, 33 GA, 33 GD, 292

[56] References Cited

U.S. PATENT DOCUMENTS

| 3,226,902 | 1/1966 | Elmendorf | 52/615 |
|---|---|---|---|
| 3,380,552 | 4/1968 | Segil et al. | 181/33 G |
| 3,439,774 | 4/1969 | Callaway et al. | 181/33 G |
| 3,501,367 | 3/1970 | Parker | 52/615 X |
| 3,616,139 | 10/1971 | Jones | 52/615 X |
| 3,670,843 | 6/1972 | Kelly et al. | 181/33 G |
| 3,769,767 | 11/1973 | Scott | 52/615 |
| 3,819,007 | 6/1974 | Wirt | 181/33 G |
| 3,895,152 | 7/1975 | Carlson et al. | 220/9 LG |
| 3,910,374 | 10/1975 | Holehouse | 181/33 G |
| 3,983,955 | 10/1976 | Vasiljevic | 181/33 G |

FOREIGN PATENT DOCUMENTS

| 1,227,345 | 3/1960 | France | 52/615 |
|---|---|---|---|
| 1,188,250 | 9/1959 | France | 52/615 |
| 30,948 | 2/1966 | Germany | 52/615 |
| 610,455 | 8/1960 | Italy | 52/615 |

Primary Examiner—J. Karl Bell
Attorney, Agent, or Firm—Blanchard, Flynn, Thiel, Boutell & Tanis

[57] ABSTRACT

A movable, prefabricated wall panel having a rigid rectangular frame. A core structure is disposed within the region bounded by the frame, which core structure comprises at least one honeycomb layer. Sheetlike skins are fixedly secured to opposite sides of the frame and extend across the region bounded by the frame for confining the honeycomb layer therebetween. A plurality of small openings are formed in either or both of the skins so that approximately a single opening will communicate with a single cell as defined by the honeycomb layer. The opening and the cell are of a preselected size so as to function as a sound absorbing chamber. The sheetlike skins are also covered by a layer of fibrous sound absorbing material, preferably fiberglass.

23 Claims, 7 Drawing Figures

SOUND ABSORBING PANEL

FIELD OF THE INVENTION

The present invention relates to a wall or space-divider structure which is built up of a plurality of prefabricated panels and, in particular, to an improved acoustical-type panel which possesses a relatively high noise reduction coefficient while additionally possessing sufficient strength to permit fixtures and accessories to be hung thereon.

BACKGROUND OF THE INVENTION

Wall structures formed from a plurality of interconnected, prefabricated and portable panels are used extensively in commercial and industrial buildings for dividing interior regions into smaller work regions. Such structures have proven particularly effective in providing greater privacy within the building, and at the same time improving the interior appearance. For this purpose, the panels are provided with many different exterior finishes, such as colored plastics, carpets and fabrics. Some of these panels also tend to minimize noise, particularly when they are provided with soft exterior finishes, such as by being covered with carpeting or fabric. Many panels of this type are also provided with slotted rails extending vertically along the edges thereof, whereupon fixtures such as desks, shelves, filing cabinets and the like can be mounted on the panels. Due to the desire to mount these fixtures on the panels, the panels thus must be provided with substantial strength and, accordingly, are normally provided with a relatively strong and rigid core so as to provide the necessary strength.

While panels of the above type do tend to minimize noise, nevertheless any noise absorption capability of the panel is normally provided solely by the outer coverings. Further, since these panels are normally of a height substantially less than the floor-to-ceiling height, this also permits the transmission of substantial noise over the panel which, when coupled with the inability of these panels to absorb a high percentage of sound at various frequencies, thus results in these panels being totally unacceptable for use in situations where a high noise reduction and absorption by the panel is necessary. Because of this inability to absorb a high percentage of the sound in the environment, these known panels have conventionally been referred to as non-acoustical-type panels.

In an attempt to provide a panel capable of absorbing a high percentage of directed sound at various frequencies, there are known several so-called "acoustical-type" panels which are more effective in absorbing the environmental noises surrounding the panels. However, to achieve this noise absorption capability, these panels normally comprise a fiberglass core with fabric coverings thereover, the core being surrounded by a rectangular frame which constitutes the sole structure for providing the panel with structural strength. These panels, due to the lack of any structural strength in the core, do not possess the strength and rigidity necessary to permit fixtures such as shelves and the like to be hung thereon. Further, these known acoustical panels possess limited durability and are easily damaged due to the softness and lack of strength possessed by the core of the panel.

In recognition of the need for an acoustical panel, the American Society of Testing Materials (ASTM) has defined an industry standard for testing the sound absorption quality of movable partitions, which standard is defined in ASTM regulation C423-66. This regulation requires that a panel or partition be tested at sound wave frequencies of 250, 500, 1000 and 2000 cycles per second. The panel is rated on a scale of from 0 to 100, and the greater the sound absorption capability of the panel, the higher the numerical rating. This numerical rating, which is normally referred to as the Noise Reduction Coefficient (NRC), is averaged over the four test frequencies set forth above. At the present time, the known carpeted panels which are capable of having fixtures hung thereon normally have an NRC in the range of 30 to 45, whereas the known acoustical panels which utilize a core constructed totally of fiberglass are relatively weak and unstable, and often do not permit fixtures and the like to be hung thereon.

Accordingly, it is an object of the present invention to provide an improved movable panel or partition of the acoustical type for absorbing a larger degree of directed sound at various frequencies, while additionally possessing substantial strength to enable fixtures to be hung thereon. More specifically, it is an object of the present invention to provide:

1. An improved acoustical wall panel, as aforesaid, which can be incorporated into a wall structure and which possesses a relatively high noise reduction coefficient (NRC), such as at least 65 or above.

2. A panel, as aforesaid, which utilizes a core structure capable of absorbing sound with a high degree of efficiency while still providing the panel with substantial strength, stability and rigidity to permit fixtures to be mounted on the panel, as by being hung thereon.

3. A panel, as aforesaid, which possesses substantial strength and durability while at the same time possessing a high noise reduction coefficient.

4. A panel, as aforesaid, which utilizes stressed skins associated with the core for providing the panel with desired strength and rigidity while at the same time permitting the panel to have a high sound absorption efficiency.

5. A panel, as aforesaid, which utilizes the Helmholtz resonator principle for absorbing sound at desired frequencies.

6. A panel, as aforesaid, wherein the core is constructed from a honeycomb structure which defines a plurality of cells, which cells are covered by the stressed skins, and which skins have small openings therein for communication with the cells to thereby define Helmholtz resonators for absorbing sound waves at varying frequencies.

7. A panel, as aforesaid, wherein the core of the panel preferably includes chambers of several sizes so as to create several different types of Helmholtz resonators to thereby absorb a wider range of sound frequencies.

8. A panel, as aforesaid, which utilizes a layer of fibrous sound absorbing material, such as fiberglass, positioned over the honeycomb core for absorbing sound waves of different frequencies.

9. A panel, as aforesaid, which can be manufactured in an economical manner utilizing materials of somewhat conventional construction, which possesses the structural characteristics of prior panels having relatively low sound absorbing capacity, which possesses all of the capabilities of the prior known acoustical panels, and which results in a substantially higher sound absorbing capability than was previously possible with panels of this general type.

3

Other objects and purposes of the present invention will be apparent upon reading the following specification and inspecting the accompanying drawings.

Figure 1:
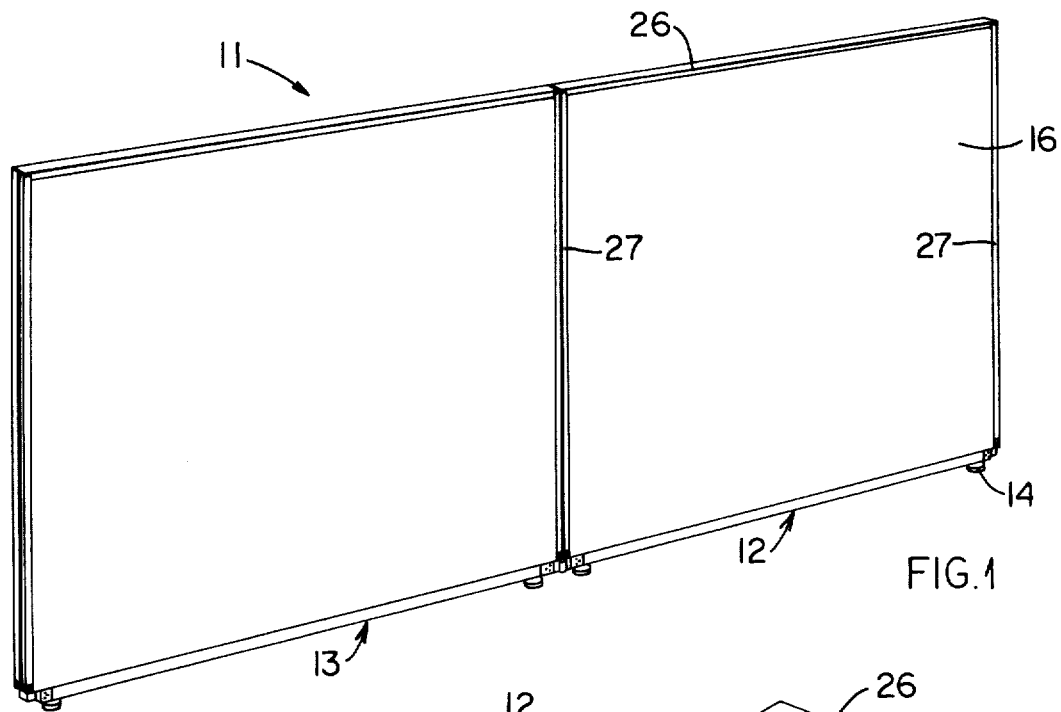
FIG. 1 is a perspective view of a wall or partition system formed from two prefabricated movable panels.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the panel and designated parts thereof. Said terminology will include the words specifically mentioned, derivatives thereof and words of similar import.

SUMMARY OF THE INVENTION

The objects and purposes of the present invention are met by providing an improved wall panel for use with a wall system formed from a plurality of such panels. The wall panel comprises a movable, portable, prefabricated panel having the capability of absorbing substantial quantities of air-born sound waves of different frequencies. The panel is formed by a large sheetlike core positioned within and connected to a surrounding rectangular frame. The frame, in the illustrated embodiment, is formed by elongated channel-shaped rails which have their adjacent ends fixedly connected together. The core structure includes a pair of substantially parallel honeycomb layers which are disposed directly adjacent one another and are bonded together. The cells of the overlapping honeycomb layers are isolated from one another by an intermediate sheetlike layer (a septum). A pair of thin structural skins, such as sheet metal skins, overlap the outer faces of the honeycomb layers and are bonded to both the honeycomb layers and the surrounding frame. The skins have a plurality of small openings formed therethrough so that each opening will approximately communicate with a single cell as formed in the underlying honeycomb layer. This opening and its relationship to the associated cell results in the formation of a Helmholtz resonator for absorbing sound waves of a desired frequency. The skins are covered by a layer of sound absorbing fibrous material, such as a layer of fiberglass. When fiberglass or the equivalent is utilized for this outer layer, then the fiberglass layer in turn is covered by a thin layer of decorative fabric. The numerous Helmholtz resonators as formed on each side of the panel permit the panel to absorb substantial quantities of sound waves having different frequencies to thereby provide the panel with a relatively high noise reduction coefficient.

In a preferred variation of the present invention, the honeycomb core structure includes several different cell sizes. For example, each of the honeycomb layers as disposed adjacent opposite sides of the panel can have at least two different sizes of cells associated therewith. As a further alternative, the honeycomb layer on one side of the panel can have cells of a first size, whereas the honeycomb layer on the other side of the panel can have cells of a second size which is substantially larger than the first size. By providing two or more sizes of cells, the capability of the panel for absorbing sound waves of different frequencies is substantially increased.

DETAILED DESCRIPTION

FIG. 1 illustrates a part of a wall system 11 which is formed by a pair of substantially identical, prefabricated portable panels or partitions 12 and 13. The panels are supported in an upright position on a support surface, such as a floor, by means of adjustable supports or feet 14. The panels have a pair of opposed and substantially planar side surfaces 16. While only two panels have been illustrated in FIG. 1, it will be appreciated that any desired number of panels can be connected together, with the adjacent panels being disposed in aligned or angled relationship so as to provide for the desired orientation of the wall system.

Figure 2:
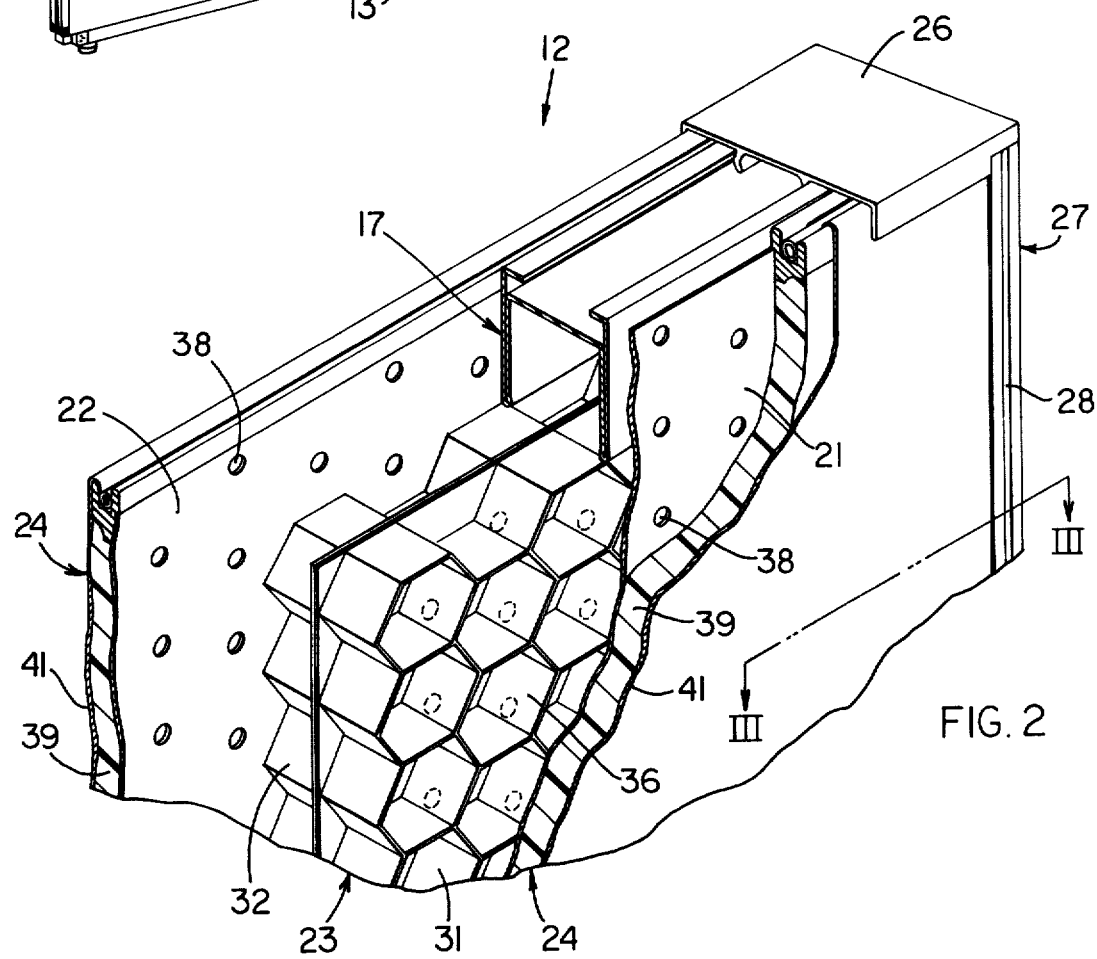
FIG. 2 is an enlarged, fragmentary perspective view of the internal structure of the improved acoustical panel according to the present invention.

The panel 12 is of a substantially rectangular shape and is defined by substantially horizontally extending top and bottom edges joined by opposed vertically extending side edges. This general rectangular shape of the panel is defined by a rigid rectangular frame disposed internally of the panel, which frame is formed from a plurality of substantially channel-shaped rails extending longitudinally along each of the panel edges. One such channel-shaped rail 17, as illustrated in FIG. 2, extends along the upper horizontal edge of the panel and a similar rail extends along the lower horizontal edge of the panel. The frame also includes substantially identical channel-shaped rails extending vertically along each side edge of the panel, one such side rail 18 being illustrated in FIG. 3.

The rigid rectangular frame formed by the rails 17 and 18 has a pair of thin facing sheets or skins 21 and 22 disposed on and fixedly secured to the opposite sides thereof, as by being adhesively secured thereto. These facing sheets are normally of a thin sheet metal. The facing sheets 21 and 22 confine a honeycomb core 23 therebetween, which core 23 substantially totally occupies the region bounded by the rectangular frame. The facing sheets 21 and 22 are additionally covered by a layer 24 of fibrous sound-absorbing material.

Figure 3:
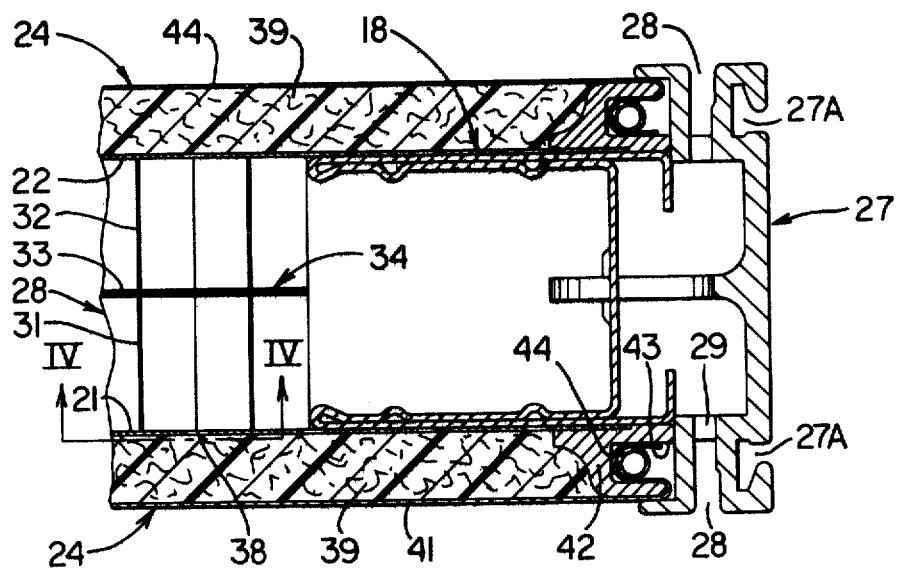
FIG. 3 is an enlarged, fragmentary sectional view taken substantially along the line III—III in FIG. 2.

The top of panel 12 is covered by a suitable top cap 26 which releasably engages the top rail 17. The vertical side edges of the panel each have an end cap 27 stationarily mounted thereon, which end cap is of channel-shaped cross section and extends throughout the height of the panel. End cap 27 is releasably connected to the adjacent side rail 18. As illustrated in FIG. 3, end cap 27 has a pair of grooves 27A formed adjacent the opposite edges thereof, which grooves receive therein elongated flexible hinge members for permitting a pair of adjacent panels to be connected together. The end cap 27 also has a groove 28 extending longitudinally thereof and facing outwardly from each side of the panel, which groove 28 communicates with slots 29 formed in the rear wall of the groove. The grooves 28 and slots 29 accommodate therein brackets associated with auxiliary fixtures which are to be mounted on the wall panel, which fixtures may comprise file cabinets, shelves and the like. Such equipment and the manner in which it is mounted on wall panels of this general type is well known.

According to the present invention, the core structure 23 of the panel is designed to absorb substantial quantities of sound waves of different frequencies. For this purpose, the core structure utilizes the Helmholtz resonator principle, in that the core structure defines a plurality of small acoustical absorption chambers so that the panel will absorb a substantial quantity of the undesired sound wave frequencies which normally occur in office and industrial environments where panels of this type are normally utilized, which frequencies are normally in the range of 250 to 2000 cycles per second.

A Helmholtz resonator comprises, in its basic construction, a cell-like structure which defines a cavity or chamber therein, which chamber is closed by the walls of the cell except for a small opening formed in one of the walls for permitting the cavity to communicate with the surrounding environment. When properly designed, as by a proper selection of the volume of the chamber and the size of the opening, the cell will function as a resonator and absorb sound waves of a selected frequency range.

Returning now to the improved panel of the present invention, and specifically the core structure 23, same is formed by a pair of superimposed honeycombs 31 and 32 positioned back-to-back. Each of the honeycombs 31 and 32 has a backing sheet 33 adhesively bonded to one side thereof, which backing sheets 33 are adhesively bonded together to form a septum or divider 34 which effectively separates and isolates the two honeycombs 31 and 32 from one another. The overall width of the two honeycombs 31 and 32, when bonded together in back-to-back relationship as shown in FIG. 3, is substantially equal to the width of the frame rails 17 and 18. The outer surfaces of the honeycombs 31 and 32 are in turn adhesively bonded to the inner surfaces of the sheet metal skins 21 and 22, respectively, which skins overlie not only the exposed surfaces of the honeycombs but also the side surfaces of the frame. The honeycombs 31 and 32 and their associated backing sheets 33 are constructed of any suitable light-weight material, preferably a nonmetallic material such as paper.

Figure 4:
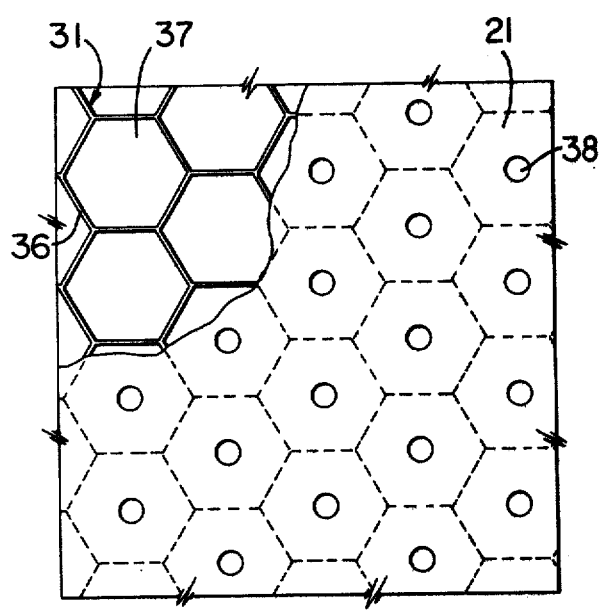
FIG. 4 is a fragmentary sectional view illustrating the core structure of the panel, same being viewed substantially along the line IV—IV in FIG. 3.

Each of the honeycombs 31 and 32 defines a plurality of cells 36 which, in the embodiment illustrated in FIGS. 2-4, are of a hexagonal cross section. Each cell 36 defines therein a cavity or chamber 37 which has the rearward or inner end closed by the septum 34, whereas the forward or outer end of the chamber is partially closed by the respective sheet metal skin 21 or 22. However, each of the skins 21 and 22 has a plurality of small openings or apertures 38 extending therethrough, which openings 38 are of extremely small cross-sectional area in relationship to the cross-sectional area of the cavity 37. Approximately one opening 38 communicates with one cavity 37 so as to form a Helmholtz resonator. While FIG. 4 illustrates the openings 38 as being aligned with the central longitudinally extending axis of the associated cavity, nevertheless this central alignment is not necessary in order to form the Helmholtz resonator since the opening 38 can be offset from the axis of the cavity. Further, is is not necessary that an opening 38 communicate with each cavity 37 as long as there are a large number of resonators formed in this manner.

As representative of typical sizes which have been experimentally determined as effective for dampening the sound waves of selected frequencies, specifically the frequencies specified in the ASTM specifications, the cavity 37 normally has a size which lies within the range of between approximately ⅛ inch and 2 inches, which dimension is measured between the opposed parallel sides of the cavity. The larger cavities are particularly suitable for use at lower frequencies, with the smaller cavities being desirable for use at higher frequencies. The openings 38 are preferably less than ¼ inch in diameter, and preferably approximately ⅛ inch in diameter. The openings 38 have a cross-sectional area which is normally no greater than approximately 8 percent, and preferably no greater than approximately 5 percent, of the cross-sectional area of the cavity 37.

In a preferred embodiment of the invention, the fibrous layer 24 comprises a relatively thick layer of fiberglass 39, which layer is also bonded to the adjacent sheet metal skin. The fiberglass layer 39 is preferably of low density, such as approximately one-half pound per cubic foot, so that its porosity enables it to efficiently absorb the higher frequency sound waves, and normally has an uncompressed thickness of between approximately ¼ and ⅝ of an inch, preferably being in the range of between ⅜ to ½ inch in thickness. The fiberglass layer 39 is in turn covered by an outer covering 41, which covering 41 comprises a thin fabric which can be of suitable color or design so as to provide the panel with a decorative appearance.

To secure the outer covering 41 in position over the fiberglass layer 39, the panel is provided with a retainer structure extending around the periphery of the panel, which retainer structure comprises a substantially U-shaped retainer 42 secured to each of the frame rails and extending longitudinally along each of the horizontal and vertical edges of the panel. The U-shaped retainer 42 has a slot 43 therein which opens outwardly away from the edge of the panel, which slot permits the free edge of the outer covering or fabric 41 to be folded over into the slot. The covering 41 is securely retained in position by means of an elongated flexible retainer element 44 which is positioned within the slot 43 and elastically and resiliently engages the free edge of the fabric so as to clamp same to the retainer 42. The retainer element 44 comprises an elongated flexible tubular member which is preferably constructed of a resiliently deformable plastic material.

OPERATION

The sound waves in the surrounding environment, as experienced in a normal office or commercial building, are predominately in the range of between approximately 250 to 2000 cycles per second. When using a panel 12 according to the present invention, which panel has the core structure formed from the two honeycombs 31 and 32, which honeycombs cooperate with the apertured sheet metal skins 21 and 22 so as to form a plurality of Helmholtz resonators, the panel is able to absorb a high percentage of the undesired sound waves. The sound waves which pass through the openings 38 into the chambers 37 are effectively absorbed so that the sound waves are accordingly not reflected or retransmitted into the surrounding environment. The Helmholtz resonators as formed within the honeycombs 31 and 32 are particularly effective for absorbing the lower frequencies, such as in the range of 500 cycles per second, whereas these resonator chambers in combination with the overlying fiberglass layer 39 is particularly effective in absorbing the higher frequencies, such as the frequencies in the range of 1000 to 2000 cycles per second. The fiberglass layer 39 specifically assists in controlling the higher frequency sound waves and thus, in conjunction with the Helmholtz resonators, is able to extend the sound absorption capability of the panel over a broader frequency range. The panel 12 of the present invention is thus able to absorb a substantially higher percentage of the sound waves of undesired frequency, and yet at the same time the panel possesses substantial strength and durability resulting from the strength imparted to the panel by the honeycomb core and the sheet metal skins which are bonded to both the core and the frame. These skins, by structurally connecting the core and the frame, thus effectively function as stressed skins and provide the panel with substantially increased rigidity, strength and durability. The panel can thus be utilized to permit fixtures such as desks, bookshelves, file cabinets and the like to be hung thereon, as by utilization of the grooves 28 and slots 29. At the same time, the panel effectively functions as an acoustical sound absorber of relatively high efficiency.

MODIFICATIONS

While the embodiment in FIGS. 2–4 uses identical honeycombs 31 and 32 of a continuous and uniform cell size, the present invention preferably uses a honeycomb having a plurality of different cell sizes to substantially extend the range of sound frequencies which can be absorbed by the panel. Providing the panel with different cell sizes can be accomplished using several techniques.

Figure 5:
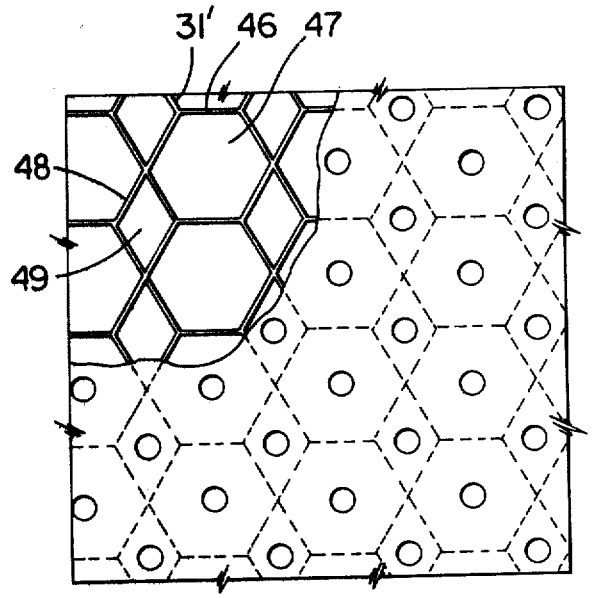
FIG. 5 is a view similar to FIG. 4 but illustrating a modified core structure.

A preferred technique for providing a multiple cell size in the honeycomb core is illustrated in FIG. 5, wherein there is illustrated a honeycomb 31' which is identical to the honeycomb 31 or 32 except that the honeycomb 31' is formed with continuous cells of at least two different sizes, there preferably being a similar number of each sized cell. More specifically, the honeycomb 31' contains a first plurality of cells 46, each of which is of hexagonal configuration and defines therein a chamber 47. The honeycomb 31' also defines a second plurality of cells 48, each of which defines a chamber 49 therein. The cell 48 is, in the illustrated embodiment, of a rectangular or diamond-shaped configuration, although the cell could be hexagonal or of any other suitable configuration since the cells 46 and 48 may assume many different shapes.

In a Helmholtz resonator chamber, the sound absorption characteristic is determined by the volume of the chamber so that the chambers 47 and 49 are of substantially different volumes so as to define two different resonator chambers capable of absorbing substantially different sound wave frequencies. Since each of the chambers is of the same depth, as defined between the septum and the outer sheet metal skin, the ratio of volumes between the chambers 47 and 49 is likewise the same as the ratio between the cross-sectional areas. The chamber 49 thus has a cross-sectional area which is substantially less than the area of the chamber 47. For example, the chamber 47 may have a size of approximately 1⅛ inches as measured between the opposed parallel sidewalls, whereas the chamber 49 may have an area substantially equivalent to a hexagonal chamber of ½ inch dimension, so that the cross-sectional area of the chamber 47 is, in one preferred embodiment of the invention, between approximately 5 and 10 times greater than the area of the chamber 49.

Thus, by constructing the panel with honeycombs 31 and 32 each of a multiple cell size, such as illustrated by the honeycomb 31', the panel will thus efficiently absorb a wider range of sound frequencies.

While FIG. 5 illustrates the two different cell sizes 46 and 48 as being uniformly distributed, it will be recognized that the different cells 46 and 48 can be randomly located if desired, or even concentrated in groups, without effecting the capability of the panel to absorb the desired sound frequencies. For example, the different sized cells 46 and 48 could be located in rows or strips which extend vertically or horizontally of the panel, or in the alternative the different sized cells could be bunched within substantially rectangular groupings in a manner similar to a checkerboard pattern if desired.

Further, while FIG. 5 illustrates the honeycomb 31', as having two different cell sizes, the present invention obviously encompasses providing the honeycomb with three or more cell sizes within the honeycomb.

Figure 6:
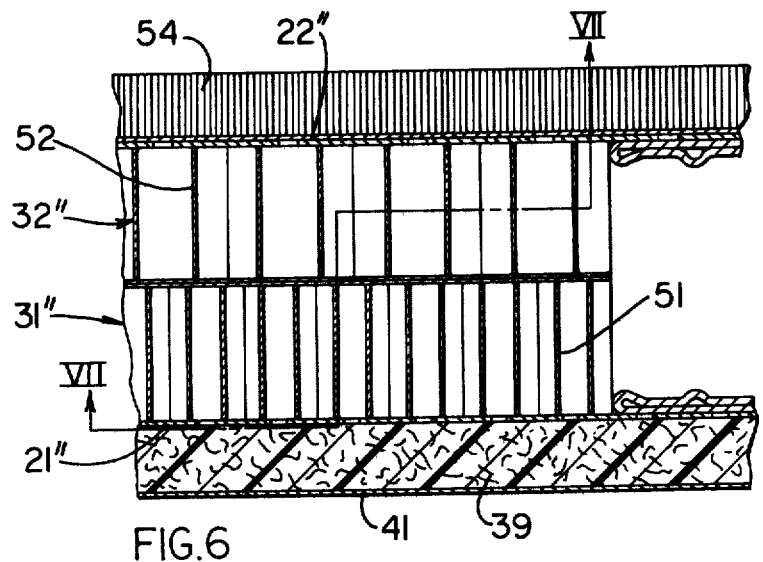
FIG. 6 is a view similar to FIG. 3 but illustrating a further modification of the present invention.
Figure 7:
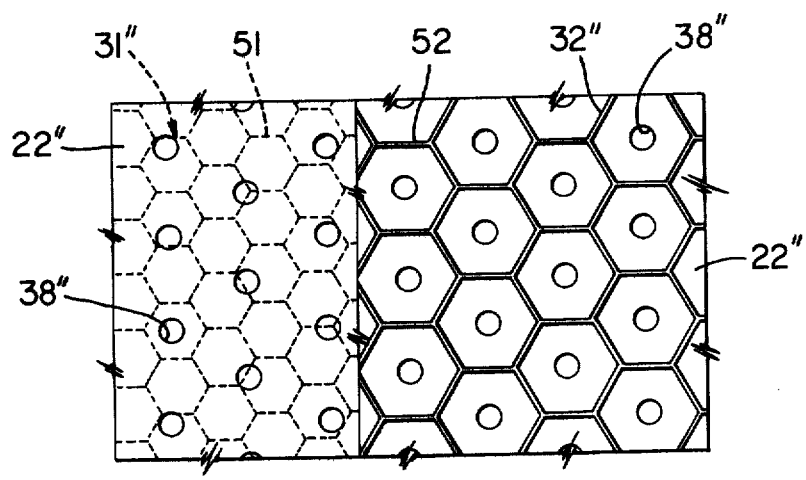
FIG. 7 is a fragmentary sectional view of the core structure taken substantially along the line VII—VII in FIG. 6.

As a further alternative, and referring to FIGS. 6 and 7, the honeycomb core structure could again utilize honeycombs 31" and 32" which are each of a uniform and continuous cell size. However, in this variation, the cells 51 associated with the honeycomb 31" would be small in relationship to the cells 52 formed in the honeycomb 32". Thus, the honeycomb 32" would thus be uniformly provided with larger cells 52 which would accordingly, be effective for absorbing the lower frequency sound waves, whereas the smaller cells 51 associated with the honeycomb 31" would, in combination with the fiberglass layer 39, be effective in absorbing the higher frequency sound waves.

This latter variation, as illustrated in FIGS. 6 and 7, is particularly desirable since it permits the utilization of commercially available honeycombs while still providing the panel with a core structure having different sizes of resonating chambers so as to effectively absorb a wide range of sound wave frequencies. In this variation, each of the sheet metal skins 21" and 22" are provided with an identical pattern or openings or apertures 38" formed therein, which openings would be positioned so that approximately one opening 38" would be aligned with each of the larger cells 52 associated with the honeycomb 32". Since the number of openings 38" formed in the skin 21" would be substantially less than the number of smaller cells 51, these openings 38" would accordingly, align with only a selected number of the cells 51. Again, each opening 38" would align with approximately only a single cell 51, and the number of resonating chambers formed by the cells 51 would be substantially equal to the number of chambers formed by the larger cells 52 on the other side of the panel. Since this arrangement would result in a large number of resonating chambers formed by the cells 51, which cells would be capable of absorbing the undesired sound frequencies, the remaining cells 51 which are not aligned with any of the openings 38" would function solely to provide the panel with the desired strength and rigidity.

If desired, the skin 21" could be provided with a pattern of openings 38" corresponding with the pattern of the underlying honeycomb 31", so that approximately a single opening 38" would communicate with each cell 51.

In place of the fiberglass layer 39, the panel may be provided with a thick layer of carpeting 54 (FIG. 6) if desired. Such layers of carpeting are also relatively effective in absorbing undesired sound frequencies. However, forming the outer layer 24 of fiberglass, rather than carpeting, is preferred since the fiberglass is substantially more effective in absorbing the undesired sound frequencies.

It will be appreciated that numerous variations can be made in the size of the individual sound absorption chambers, or in the volume and cross-sectional area thereof, and likewise substantial variations can be made in the length and cross-sectional area of the openings formed in the sheet metal skins, so as to vary the sound absorption characteristics of the individual resonators. These resonators can be designed to absorb the desired frequencies, and thus these variations in the sizes of the chambers are encompassed within the present invention. In a further possible variation of the present invention, a substantial increase in the length of the individual sound absorbing chambers can be achieved, such as by eliminating the intermediate divider or septum 34 whereby one opening 38 will communicate with only one end of the resulting longer chamber. In the alternative, small holes may be provided in the septum 34 or through the sidewall between adjacent chambers so that two axially aligned or side-by-side chambers can thus communicate with one another. This double chamber arrangement would still further vary the frequency absorption characteristics.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a portable interior space divider panel having opposed enlarged side surfaces and a sound absorbing core structure disposed between said side surfaces and extending substantially coextensively over the area thereof, comprising the improvement wherein said core structure includes first means for absorbing sound waves of lower frequency and second means for absorbing sound waves of substantially higher frequency, one of said sound absorbing means including a plurality of Helmholtz resonators each defined by a small substantially closed chamber disposed interiorly of the wall panel and communicating with the surrounding environment through small opening means which projects outwardly from the respective chamber toward one of the side surfaces of the panel, said plurality of Helmholtz resonators including pluralities of first and second resonators of different size for absorbing sound waves of different frequency, each said first resonator being defined by a first interior chamber which is substantially closed except for first opening means which extends through the side surface of the panel and provides communication between said first chamber and the surrounding environment, each said second resonator being defined by a second interior chamber which is substantially closed and communicates with the surrounding environment through second opening means which extends through the side surface of the panel, and the other sound absorbing means comprising a layer of porous sound absorbing material which overlies said plurality of Helmholtz resonators and is substantially coextensive therewith.

2. A panel according to claim 1, wherein said first chambers are of substantially greater volume than said second chambers.

3. A panel according to claim 2, wherein said porous sound absorbing material comprises fiberglass.

4. A panel according to claim 1, wherein said panel has a sheetlike structural skin extending thereover and closing one end of said Helmholtz resonators, said skin defining said side surface and having said first and second opening means formed therein and extending therethrough for communication with the respective chambers.

5. A panel according to claim 1, wherein said panel has a substantially rigid ringlike rectangular frame and a pair of thin sheetlike metal skins disposed on opposite sides of the frame and fixed thereto, said skins effectively closing said frame and defining an interior region, and said core structure being disposed within and substantially occupying the interior region bounded by said frame and defined between said skins, said core structure comprising a honeycomb layer defining therein pluralities of said first and second interior chambers, said skins closing the outer ends of said interior chambers, and said first and second opening means being formed in and extending through at least one of said skins for communication with the chambers so as to define said first and second resonators.

6. A panel according to claim 5, wherein each of said skins has said first and second opening means formed therein, at least some of said first interior chambers being aligned with said first opening means as formed in one skin and the remainder of said first chambers being aligned with the first opening means formed in the other skin, and at least some of said second interior chambers being aligned with the second opening means formed in the one skin and the remaining second chambers being aligned with the second opening means as formed in the other skin, whereby some of each of the first and second resonators open outwardly through each of the skins.

7. A panel according to claim 6, wherein each other face of the honeycomb layer is adhesively secured to the adjacent overlying surface of the respective skin.

8. A panel according to claim 6, wherein the honeycomb layer includes first and second layers disposed in adjacent back-to-back relationship, each of said first and second layers having a plurality of said first and second interior chambers formed therein, and septum means positioned between and engaged with the adjacent inner faces of the first and second layers for substantially isolating the interior chambers of the first layer from the interior chambers of the second layer, the outer faces of the first and second layers being disposed in engagement with the adjacent skin.

9. A panel according to claim 6, wherein said layer of porous sound absorbing material comprises a layer of fiberglass positioned exteriorly of and substantially coextensive with each of said skins, and a thin sheetlike porous covering positioned exteriorly of and overlying each of said fiberglass layers.

10. A panel according to claim 1, wherein said first interior chamber has a volume which is between approximately five and ten times greater than the volume of said second interior chamber.

11. A panel according to claim 6, wherein said first opening means includes a first opening of a preselected diameter formed in the skin and communicating with each said first interior chamber, said second opening means including a second opening of preselected diameter formed in the skin and communicating with each said second interior chamber, whereby at least one of said openings of said preselected diameter communicates with each of said first and second interior chambers.

12. A panel according to claim 5, wherein said honeycomb layer is constructed of paper.

13. In an interior space dividing wall formed from a plurality of portable interior upright space divider panels which are horizontally connected together in series, at least some of said panels being of an acoustical construction for absorbing sound waves, each said acoustical panel having opposed enlarged side surfaces and a sound absorbing core structure defined between said side surfaces and extending substantially coextensively over the area thereof, comprising the improvement wherein said core structure includes first means for absorbing sound waves of lower frequency and second means for absorbing sound waves of substantially higher frequency, one of said sound absorbing means including a plurality of Helmholtz resonators each defined by a small substantially closed chamber disposed interiorly of the panel and communicating with the surrounding environment through small opening means which project outwardly from the respective chamber toward one of the side surfaces of the panel, said plurality of Helmholtz resonators including pluralities of first and second resonators of different size for absorbing sound waves of different frequency, each said first resonator being defined by a first interior chamber which is substantially closed except for first opening means which extends through the side surface of the panel and provides communication between said first chamber and the surrounding environment, each said second resonator being defined by a second interior chamber which is substantially closed and communicates with the surrounding environment through second opening means which extends through one of the side surfaces of the panel.

14. A wall system according to claim 13, wherein said core structure is formed by a honeycomb layer which defines therein said pluralities of first and second interior chambers, said sound absorbing panel also including a rigid ringlike frame which is disposed in surrounding relationship to the honeycomb layer, and a pair of thin sheetlike structural skins positioned on opposite sides of the frame and extending thereacross for confining the honeycomb layer therebetween, said skins being adhesively bonded to the adjacent outer faces of the honeycomb layer for creating a rigid composite structure, said skins having said opening means formed therein.

15. A system according to claim 14, wherein said other sound absorbing means comprises a layer of porous sound absorbing material positioned adjacent each said skin and overlying said skin and the opening means formed therein.

16. A wall system according to claim 14, including a layer of flexible material positioned coextensively with and overlying the outer surface of each of said skins.

17. A wall system according to claim 1, wherein said core structure is formed by a honeycomb layer which defines therein said pluralities of first and second interior chambers, said sound absorbing panel also including a rigid ringlike frame which is disposed in surrounding relationship to the honeycomb layer, and a pair of thin sheetlike structural skins positioned on opposite sides of the frame and extending thereacross for confining the honeycomb layer therebetween, said skins being adhesively bonded to the adjacent outer faces of the honeycomb layer for creating a rigid composite structure, said skins having said opening means formed therein.

18. In a portable interior upright space divider panel having opposed enlarged side surfaces and a sound absorbing core structure defined between said side surfaces and extending substantially coextensively over the area thereof, comprising the improvement wherein there is provided a rigid ringlike frame of substantially rectangular configuration, a pair of thin platelike structural skins positioned adjacent opposite sides of said frame and extending over the opening defined within said frame whereby said skins in cooperation with said frame define an interior region, said skins being rigidly fixed to said frame, and said sound absorbing core structure being positioned within the interior region defined within said frame and between said skins, said sound absorbing core structure including means for absorbing sound waves of substantially different frequencies, said sound absorbing means including a first plurality of Helmholtz resonators each defined by a small substantially closed chamber disposed within the interior region and communicating with the surrounding environment solely through small opening means which projects outwardly from the respective chamber through one of said skins, said sound absorbing means also including a second plurality of Helmholtz resonators each defined by a small substantially closed chamber disposed within said interior region and communicating with the surrounding environment solely through small opening means which projects outwardly from the respective chamber through the other of said skins, each of said first and second pluralities of Helmholtz resonators including pluralities of first and second resonators of different size for absorbing sound waves of different frequency, each said first resonator being defined by a first interior chamber which is substantially closed except for said small opening means which extends through the respective skin for providing communication between the respective first chamber and the surrounding environment, each said second resonator being defined by a second interior chamber which is substantially closed and communicates with the surrounding environment solely through said small opening means which extends through the respective skin.

19. A panel according to claim 18, wherein said sound absorbing means is formed by a honeycomb layer which extends coextensively with and between said pair of skins, said honeycomb layer defining therein said first and second interior chambers, said honeycomb layer having opposite outer side faces which are adhesively secured to the adjacent inner surfaces of the respective skins, said skins and said honeycomb layer defining a rigid composite structure.

20. A panel according to claim 19, including a layer of porous fabric positioned externally of and overlying each of said skins.

21. A panel according to claim 18, including sound absorbing layer means for absorbing sound waves of a frequency substantially different from that absorbed by said first and second resonators, said sound absorbing layer means comprising a layer of porous sound absorbing material positioned adjacent each said skin so as to overlie the small opening means formed therethrough.

22. In an interior space dividing wall formed from a plurality of portable interior upright space divider panels which are horizontally connected together in series, at least some of said panels being of an acoustical construction for absorbing sound waves, each said acoustical panel having opposed enlarged side surfaces and a sound absorbing core structure defined between said side surfaces and extending substantially coextensively over the area thereof, comprising the improvement wherein said acoustical panel includes a rigid ringlike frame of substantially rectangular configuration, a pair of thin platelike structural skins positioned adjacent opposite sides of said frame and extending over the region defined within said frame, said skins being rigidly fixed to said frame, said sound absorbing core structure including first means for absorbing sound waves of lower frequency and second means for absorbing sound waves of substantially higher frequency, one of said sound absorbing means including a plurality of Helmholtz resonators each defined by a small substantially closed chamber disposed interiorly of the panel between the pair of skins and communicating with the surrounding environment through small opening means which projects outwardly from the respective chamber toward one of the side surfaces of the panel, said small opening means being formed in and extending through one of said skins, said plurality of Helmholtz resonators being formed by a honeycomb layer which defines a plurality of said chambers, said chambers being substantially closed except for said small opening means, the small opening means associated with some of said chambers being associated with one of the skins and the small opening means as associated with the remaining chambers being formed in the other skin, said honeycomb layer being sandwiched between and fixedly secured to said pair of skins for forming a rigid composite structure, and the other of said sound absorbing means comprising porous sound absorbing material positioned adjacent each said skin so as to overlie the respective skin and the small opening means formed therein.

23. A wall system according to claim 22 wherein each acoustical panel has a thin flexible covering of fabriclike material overlying each side of the panel and defining said opposed side surfaces.

* * * * *